US012730652B2

(12) United States Patent
Sugai et al.

(10) Patent No.: US 12,730,652 B2
(45) Date of Patent: Sep. 8, 2026

(54) INFORMATION PROCESSING APPARATUS AND CONTROL METHOD

(71) Applicant: Lenovo (Singapore) Pte. Ltd., Singapore (SG)

(72) Inventors: Shunki Sugai, Kanagawa (JP); Mikio Hagiwara, Kanagawa (JP); Eitaroh Kasamatsu, Kanagawa (JP); Keisuke Arai, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 112 days.

(21) Appl. No.: 18/784,304

(22) Filed: Jul. 25, 2024

(65) Prior Publication Data

US 2025/0094178 A1 Mar. 20, 2025

(30) Foreign Application Priority Data

Sep. 14, 2023 (JP) ................................ 2023-149565

(51) Int. Cl.
*G06F 9/4401* (2018.01)

(52) U.S. Cl.
CPC .................................. *G06F 9/4406* (2013.01)

(58) Field of Classification Search
CPC .................................................... G06F 9/4406
See application file for complete search history.

(56) References Cited

U.S. PATENT DOCUMENTS 6,567,912 B1 * 5/2003 Belkin .................. G06F 9/4411 710/10
7,213,139 B2 * 5/2007 Zhang .................. G06F 9/4418 713/1
7,590,877 B2 * 9/2009 Kim ........................ G06F 9/441 718/107
7,774,586 B2 * 8/2010 Hsu ..................... G06F 3/04886 713/1
8,982,158 B2 * 3/2015 Chen ..................... G06F 3/1415 345/649

(Continued)

FOREIGN PATENT DOCUMENTS

JP H05274868 A 10/1993
JP 2009-277223 A 11/2009

(Continued)

*Primary Examiner* — Aurel Prifti

(74) *Attorney, Agent, or Firm* — Osha Bergman Watanabe & Burton LLP

(57) ABSTRACT

An information processing apparatus includes: a system memory in which a program and data are stored; and a control unit configured to execute processing based on a BIOS and an OS. The control unit is configured to executes: a first memory initialization process of, before the OS is started, executing initialization on an area with a partial capacity necessary for start-up of the OS in the system memory by processing of the BIOS; an OS start-up process of starting the OS by processing of the BIOS after the execution of the first memory initialization process, the OS start-up process including a display process on a display section; and a second memory initialization process of, after the execution of the OS start-up process, executing initialization on a remaining area of the system memory other than the area with the partial capacity by processing of the BIOS.

4 Claims, 4 Drawing Sheets

(56) References Cited

U.S. PATENT DOCUMENTS

| | | | | |
|---|---|---|---|---|
| 11,249,767 | B2 * | 2/2022 | Suryanarayana | G06F 3/0673 |
| 2002/0152372 | A1 * | 10/2002 | Cole | G06F 1/1616 713/2 |
| 2006/0294357 | A1 * | 12/2006 | Choo | G06F 9/441 713/2 |
| 2008/0046613 | A1 * | 2/2008 | Lai | G06F 9/4401 710/58 |
| 2008/0089260 | A1 * | 4/2008 | Tsukamoto | G06F 1/1616 370/311 |
| 2008/0130599 | A1 * | 6/2008 | Horikoshi | H04B 7/0817 370/338 |
| 2009/0150779 | A1 * | 6/2009 | Kodama | G06F 9/453 715/708 |
| 2009/0287900 | A1 * | 11/2009 | Kirscht | G06F 9/4406 711/E12.002 |
| 2013/0054952 | A1 * | 2/2013 | Shen | G06F 13/00 710/303 |
| 2013/0111201 | A1 * | 5/2013 | Wood | G06F 9/441 713/2 |
| 2014/0082341 | A1 * | 3/2014 | Lin | G06F 9/4418 713/2 |
| 2017/0277468 | A1 * | 9/2017 | Nakayama | G06F 3/0683 |
| 2023/0325510 | A1 * | 10/2023 | Tu | G06F 9/4408 726/27 |

FOREIGN PATENT DOCUMENTS

| | | | |
|---|---|---|---|
| JP | 2014-170445 | A | 9/2014 |
| JP | 2016181106 | A | 10/2016 |
| JP | 2018-156230 | A | 10/2018 |
| JP | 2020-86606 | A | 6/2020 |
| WO | 2002/095556 | A1 | 11/2002 |

* cited by examiner 121
12
INITIALIZATION PROCESS
UNUSABLE
122

121
12
USABLE
UNUSABLE
122

121
12
USABLE
INITIALIZATION PROCESS
122

121
12
USABLE
USABLE
122

INFORMATION PROCESSING APPARATUS AND CONTROL METHOD

CROSS-REFERENCE TO RELATED APPLICATIONS

This application claims priority to Japanese Patent Application No. 2023-149565 filed on Sep. 14, 2023, the contents of which are hereby incorporated herein by reference in their entirety.

BACKGROUND

Technical Field

The present invention relates to an information processing apparatus and a control method.

Description of the Related Art

As for an information processing apparatus such as a personal computer (PC), it is general that, at the time when the apparatus is started, equipped devices are initialized and tested by a BIOS (Basic Input Output System), and after that, an OS (Operating System) is started (see, for example, Japanese Unexamined Patent Application Publication No. 2020-86606). In such an information processing apparatus, at the time when the apparatus is started, a memory initialization process of initializing a system memory such as a DIMM (Dual Inline Memory Module), for example, is executed before the OS is started.

However, in recent years, the capacity of an equipped memory has tended to increase. Because of this, a conventional information processing apparatus requires a longer period for execution of the memory initialization process and has such a problem that, at the time when the apparatus is started, a period (a black-screen period) during which a display section has no display before the OS is started is prolonged, for example.

SUMMARY

The present invention is accomplished in view of the above problem, and an object of the present invention is to provide an information processing apparatus and a control method each of which can reduce a period during which a display section has no display before an OS is started, at the time when the apparatus is started.

In order to solve the above problem, an information processing apparatus according to the first aspect of the present invention includes: a system memory in which a program and data are stored; and a control unit configured to execute processing based on a BIOS (Basic Input Output System) and an OS (Operating System). The control unit is configured to execute: a first memory initialization process of, before the OS is started, executing initialization on an area with a partial capacity necessary for start-up of the OS in the system memory by processing of the BIOS; an OS start-up process of starting the OS by processing of the BIOS after the execution of the first memory initialization process, the OS start-up process including a display process on a display section; and a second memory initialization process of, after the execution of the OS start-up process, executing initialization on a remaining area of the system memory other than the area with the partial capacity by processing of the BIOS.

In the information processing apparatus according to the first aspect of the present invention, the control unit may execute the first memory initialization process and the second memory initialization process at a time of starting the OS in any of a case where the information processing apparatus is turned on for the first time, a case where a configuration of the BIOS is changed, and a case where a capacity or a module of the system memory is changed; and at a time of starting the OS normally, the control unit may omit the first memory initialization process and the second memory initialization process and executes the OS start-up process as a normal OS start-up process.

In the information processing apparatus according to the first aspect of the present invention, in the first memory initialization process, the control unit may allow access to the area with the partial capacity, prohibit access to the remaining area, and execute the initialization, and in the second memory initialization process, the control unit may allow access to the remaining area and execute the initialization.

In the information processing apparatus according to the first aspect of the present invention, in the second memory initialization process, the control unit may execute the initialization on the remaining area by a run-time process in parallel with normal processing of the OS start-up process and detect, by the OS, the remaining area as hot-insertion.

A control method according to the second aspect of the present invention is a control method for controlling an information processing apparatus including a system memory in which a program and data are stored, and a control unit configured to execute processing based on a BIOS (Basic Input Output System) and an OS (Operating System), and the control method includes: a first memory initialization process step of, before the OS is started, the control unit executing initialization on an area with a partial capacity necessary for start-up of the OS in the system memory by processing of the BIOS; an OS start-up process step of the control unit starting the OS by processing of the BIOS after the execution of the first memory initialization process step, the OS start-up process step including a display process on a display section; and a second memory initialization process step of, after the execution of the OS start-up process step, the control unit executing initialization on a remaining area of the system memory other than the area with the partial capacity by processing of the BIOS.

The above-described aspects of the present invention can reduce a period during which the display section has no display before the OS is started at the time when the apparatus is started.

DETAILED DESCRIPTION

The following describes an information processing apparatus and a control method according to one embodiment of the present invention with reference to the drawings.

Figure 1:
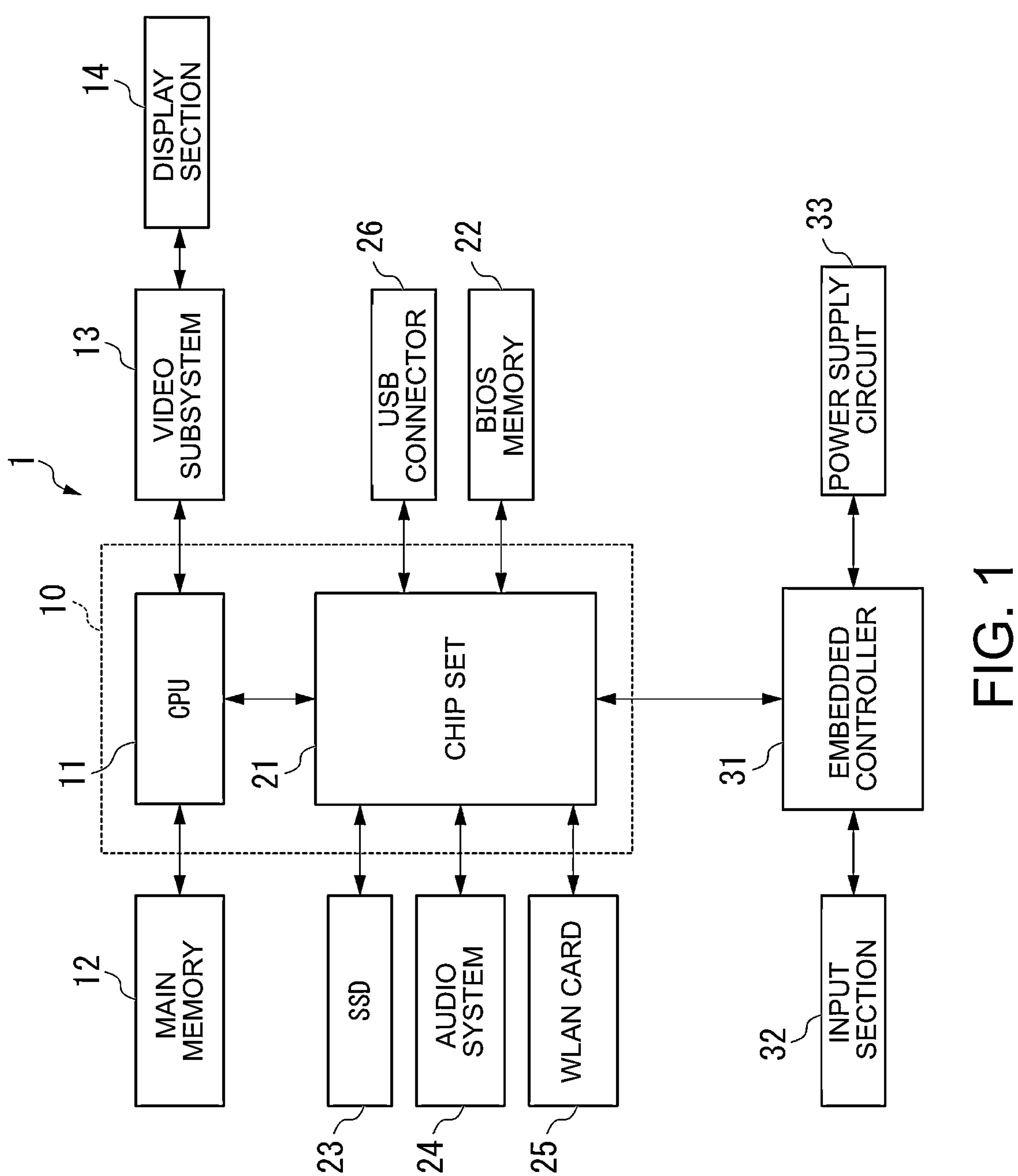
FIG. 1 is a drawing illustrating an example of a main hardware configuration of a laptop PC according to the present embodiment.

FIG. 1 is a drawing illustrating an example of a main hardware configuration of a laptop PC 1 according to the present embodiment. Note that, in the present embodiment, the laptop PC 1 is described as an example of the information processing apparatus.

As illustrated in FIG. 1, the laptop PC 1 includes a CPU 11, a main memory 12, a video subsystem 13, a display section 14, a chip set 21, a BIOS memory 22, an SSD 23, an audio system 24, a WLAN card 25, a USB connector 26, an embedded controller 31, an input section 32, and a power supply circuit 33.

Note that, in the present embodiment, the CPU 11 and the chip set 21 correspond to a main control unit 10. The main control unit 10 is an example of a processor (a main processor) configured to execute a program stored in a memory (the main memory 12).

The CPU (Central Processing Unit) 11 executes various arithmetic processes by a program control and controls the whole laptop PC 1.

The main memory 12 is a writable memory used as a read-in area for an execution program to be executed by the CPU 11 or a work area in which the processing data of the execution program is written. The main memory 12 is constituted by a plurality of DRAM (Dynamic Random Access Memory) chips, for example. The execution program includes various drivers for operating a BIOS (Basic Input Output System), an OS, or peripheral devices by hardware, various services and utilities, an application program, and so on.

The main memory 12 is also an example of a system memory in which a program and data are stored and is provided in the laptop PC 1 in the form of a DIMM provided with the plurality of DRAMS.

The video subsystem 13 is a subsystem for implementing a function related to image display and includes a video controller. The video controller processes a drawing command from the CPU 11 and writes processed drawing information in a video memory, and also reads the drawing information from the video memory and outputs the drawing information to the display section 14 as drawing data (display data).

The display section 14 is a liquid crystal display, for example, and displays a display screen based on the drawing data (display data) output from the video subsystem 13.

The chip set 21 includes a plurality of controllers such as a USB (Universal Serial Bus), a serial ATA (AT Attachment), an SPI (Serial Peripheral Interface) bus, a PCI (Peripheral Component Interconnect) bus, a PCI-Express bus, and an LPC (Low Pin Count) bus, and a plurality of devices is connected to the chip set 21. In FIG. 1, as examples of the devices, the BIOS memory 22, the SSD 23, the audio system 24, the WLAN card 25, and the USB connector 26 are connected to the chip set 21.

The BIOS memory 22 is constituted by an electrically rewritable nonvolatile memory such as an EEPROM (Electrically Erasable Programmable Read Only Memory) or a flash ROM, for example. The BIOS, system firmware for controlling the embedded controller 31 or the like, and so on are stored in the BIOS memory 22.

In the SSD (Solid State Drive) 23 (an example of a nonvolatile storage device), the OS, various drivers, various services and utilities, an application program, and various pieces of data are stored.

The audio system 24 records, plays, and outputs sound data.

The WLAN (Wireless Local Area Network) card 25 is connected to a network via a wireless LAN and performs data communication.

The USB connector 26 is a connector to which peripheral devices using a USB are connected.

The embedded controller 31 (an example of a sub-control unit) is a one-chip microcomputer configured to monitor and control various devices (peripheral devices, sensors, and the like) regardless of the system state of the laptop PC 1. The embedded controller 31 also has a power-supply management function to control the power supply circuit 33. Note that the embedded controller 31 is constituted by a CPU, a ROM, a RAM, and so on (not illustrated) and includes A/D input terminals for a plurality of channels, a D/A output terminal, a timer, and a digital input-output terminal. The input section 32, the power supply circuit 33, and so on are connected to the embedded controller 31 via those input-output terminals, for example, and the embedded controller 31 controls the operations of them.

The input section 32 is an input device such as a keyboard, a pointing device, or a touch pad, for example.

The power supply circuit 33 includes, for example, a DC/DC converter, a charging and discharging unit, a battery unit, an AC/DC adapter, and so on and converts a direct-current voltage to be supplied from the AC/DC adapter or the battery unit into a plurality of voltages necessary to operate the laptop PC 1. The power supply circuit 33 also supplies electric power to various sections of the laptop PC 1 based on the control from the embedded controller 31.

Figure 2:
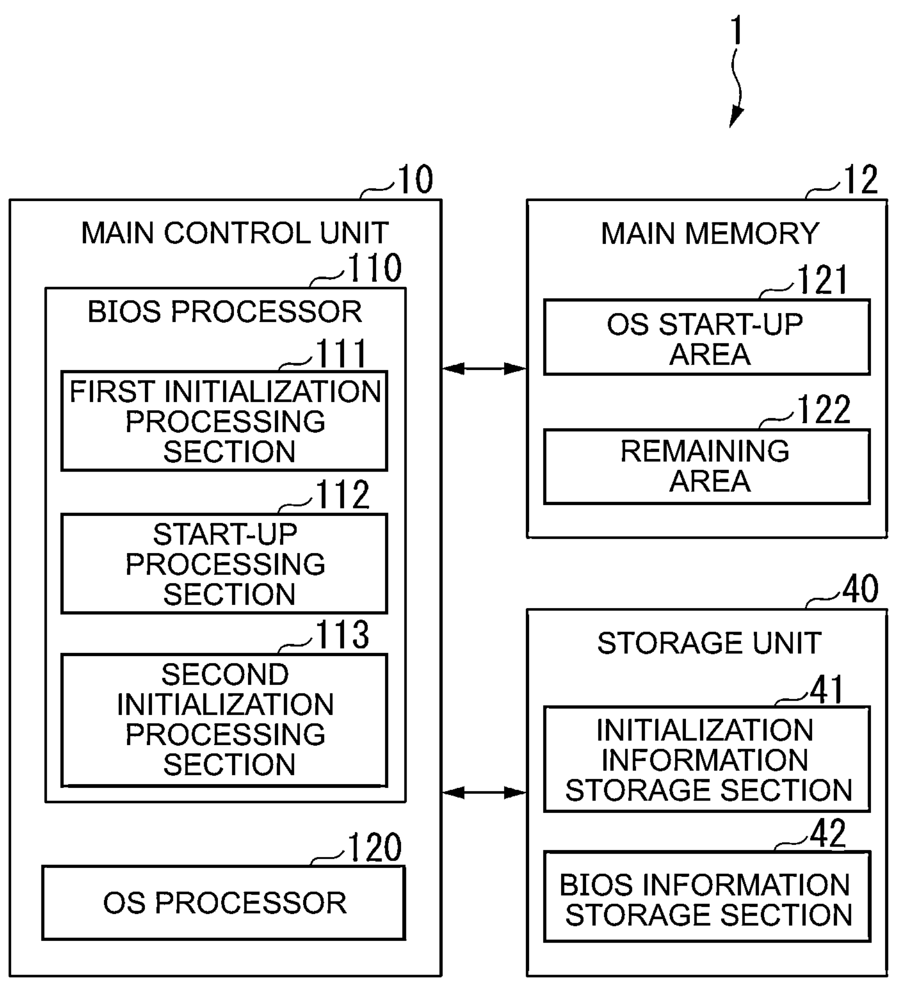
FIG. 2 is a functional block diagram illustrating an exemplary functional configuration of the laptop PC according to the present embodiment.

Next will be described the functional configuration of the laptop PC 1 according to the present embodiment with reference to FIG. 2. FIG. 2 is a functional block diagram illustrating an exemplary functional configuration of the laptop PC 1 according to the present embodiment. Note that, in FIG. 2, only configurations related to the present invention will be described among functional configurations of the laptop PC 1.

As illustrated in FIG. 2, the laptop PC 1 includes the main control unit 10, a main memory 12, and a storage unit 40.

The storage unit 40 is a storage unit achieved by the BIOS memory 22 or the SSD 23, for example, and various pieces of information used for various processes of the main control unit 10 are stored in the storage unit 40, for example. The storage unit 40 includes an initialization information storage section 41 and a BIOS information storage section 42.

The initialization information storage section 41 is a storage section achieved by the BIOS memory 22, for example, and configuration information obtained by an initialization process for the main memory 12 is stored in the initialization information storage section 41.

The BIOS information storage section 42 is a storage section achieved by the BIOS memory 22, for example, and various pieces of configuration information of the BIOS are stored in the BIOS information storage section 42.

The main memory 12 includes an OS start-up area 121 and a remaining area 122.

The OS start-up area 121 is an area achieved by a RAM such as a DIMM and having a partial capacity necessary for start-up of the OS in the main memory 12, for example, and is an area with a minimum capacity to start the OS (for example, 4 GB (gigabytes) in the case of Windows (registered trademark)).

The remaining area 122 is achieved by a RAM such as a DIMM, for example, and is a remaining area other than the OS start-up area 121 in the main memory 12 and an area obtained by excluding the OS start-up area 121 from the main memory 12.

The main control unit 10 (an example of a control unit) is a function unit achieved such that the main control unit 10 causes the CPU 11 and the chip set 21 to read programs stored in the BIOS memory 22 and the SSD 23 into the main memory 12 and execute the programs. The main control unit 10 executes various processes based on the BIOS and the OS. The main control unit 10 includes a BIOS processor 110 and an OS processor 120.

The BIOS processor 110 executes various processes (BIOS processes) based on the BIOS. The BIOS processor 110 includes a first initialization processing section 111, a start-up processing section 112, and a second initialization processing section 113.

The first initialization processing section 111 executes a first memory initialization process by processing of the BIOS before the OS is started. Here, the first memory initialization process is a process of executing initialization on the area (the OS start-up area 121) with the partial capacity necessary for start-up of the OS in the main memory 12. The first initialization processing section 111 executes the first memory initialization process at the time of start-up in any of the following cases: a case where the laptop PC 1 is turned on for the first time; a case where the configuration of the BIOS (configuration information stored in the BIOS information storage section 42) is changed; and a case where the capacity or the module (for example, the DIMM or the like) of the main memory 12 is changed.

In the first memory initialization process, the first initialization processing section 111 allows access to the OS start-up area 121, prohibits access to the remaining area 122, and then executes initialization.

The first initialization processing section 111 also stores, in the initialization information storage section 41, various pieces of configuration information about memory initialization as a result of a memory initialization process (the first memory initialization process) on the OS start-up area 121.

The start-up processing section 112 executes various processes to start the laptop PC 1 (the OS) among the processes based on the BIOS. After the first memory initialization process is executed, the start-up processing section 112 executes an OS start-up process by processing of the BIOS. Here, the OS start-up process is a process of starting the OS, including a displaying process on the display section 14, for example.

When the first memory initialization process is executed, the start-up processing section 112 starts the OS only by use of the OS start-up area 121.

The start-up processing section 112 also executes a normal OS start-up process in a case where the memory initialization process has been already executed on the main memory 12 (in a case where the first memory initialization process is not executed). In the normal OS start-up process, the start-up processing section 112 executes the OS start-up process in a state where all areas in the main memory 12 are usable. In this case, the start-up processing section 112 omits the memory initialization process based on the initialization information stored in the initialization information storage section 41.

After the OS start-up process is executed, the second initialization processing section 113 executes a second memory initialization process by processing of the BIOS. Here, the second memory initialization process is a process of executing initialization on the area (the remaining area 122) other than the OS start-up area 121 in the main memory 12. The second initialization processing section 113 executes the second memory initialization process at the time of start-up in any of the following cases: a case where the laptop PC 1 is turned on for the first time; a case where the configuration of the BIOS (the configuration information stored in the BIOS information storage section 42) is changed; and a case where the capacity or the module (for example, the DIMM or the like) of the main memory 12 is changed.

In the second memory initialization process, the second initialization processing section 113 allows access to the remaining area 122 and executes initialization.

In the second memory initialization process, for example, the second initialization processing section 113 executes initialization on the remaining area 122 by a run-time process in parallel with normal processing of the OS start-up process and detects the remaining area 122 as hot-insertion (for example, hot-insertion of the DIMM) by the OS.

The second initialization processing section 113 also stores, in the initialization information storage section 41, various pieces of configuration information about memory initialization as a result of a memory initialization process (the second memory initialization process) on the remaining area 122.

Note that the second memory initialization process by the second initialization processing section 113 is not executed by the BIOS processor 110 when the first memory initialization process is not executed by the first initialization processing section 111.

The OS processor 120 is a function unit taking over processing after the OS start-up process is executed by the BIOS processor 110. The OS processor 120 executes various processes based on the OS.

Next will be described the operation of the laptop PC 1 according to the present embodiment with reference to the drawings.

FIGS. 3A-3D are drawings to describe an example of the initialization process for the main memory 12 in the present embodiment.

Figures 3A, 3B, 3C, 3D:
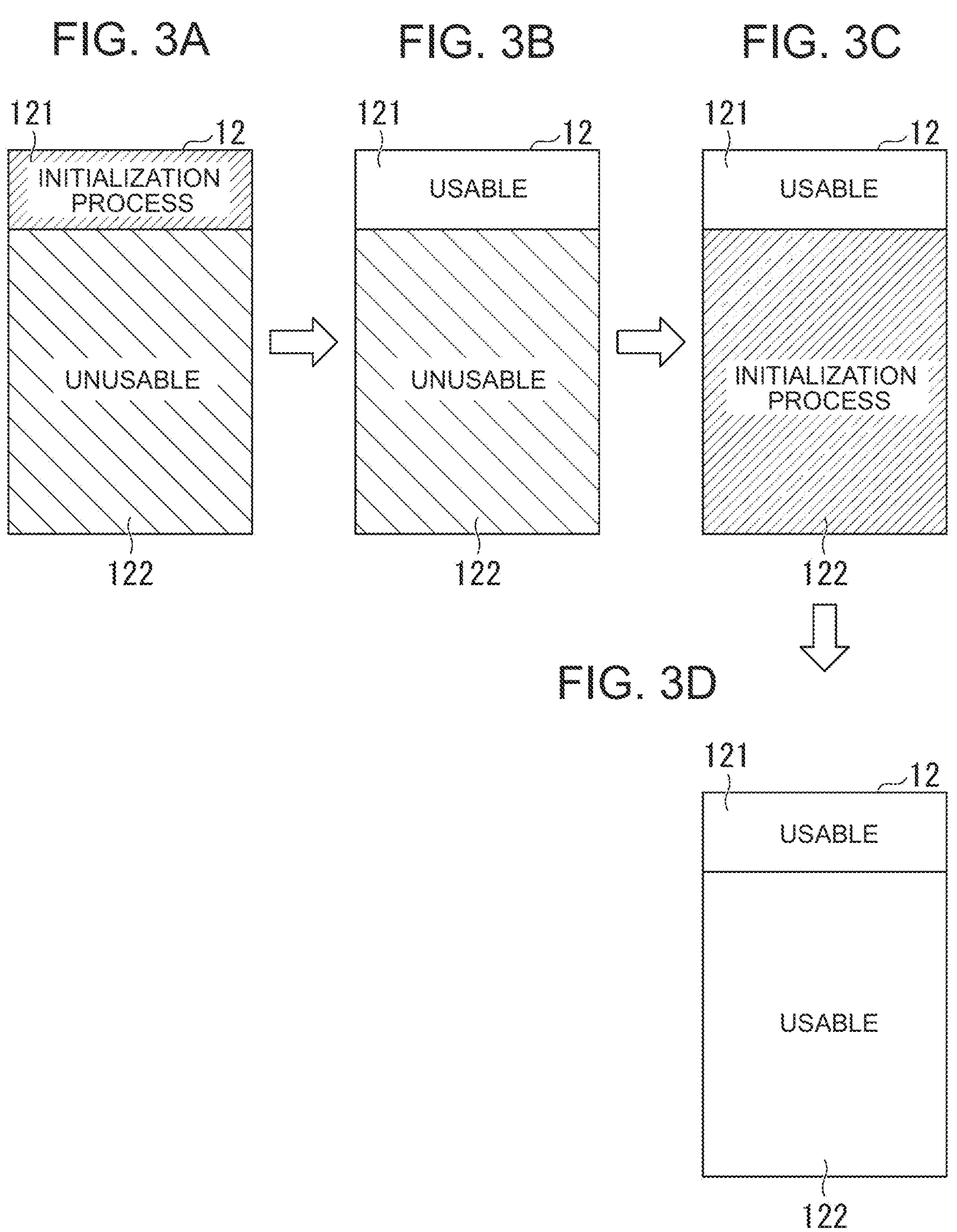
FIGS. 3A-3D are drawings to describe an example of an initialization process for a main memory in the present embodiment.

In FIG. 3A, the first initialization processing section 111 executes initialization of the OS start-up area 121, which is an area with a minimum capacity to start the OS, for example (the first memory initialization process). In this state, the memory (DRAM) of the remaining area 122 is in an unusable state.

Subsequently, when the first memory initialization process is completed, the process proceeds to the state of FIG. 3B, and the OS start-up area 121 in the main memory 12 is brought into in a usable state. In this state, the start-up processing section 112 starts the OS by use of the OS start-up area 121.

Subsequently, in FIG. 3C, the second initialization processing section 113 executes initialization of the remaining area 122, which is an area with a remaining capacity other than the OS start-up area 121, for example (the second memory initialization process).

Subsequently, when the second memory initialization process is completed, the process proceeds to the state of FIG. 3D, and the remaining area 122 in the main memory 12 is brought into in a usable state. The OS processor 120 detects the remaining area 122 as hot-insertion by processing of the OS and brings all areas of the main memory 12 into a usable state.

Figure 4:
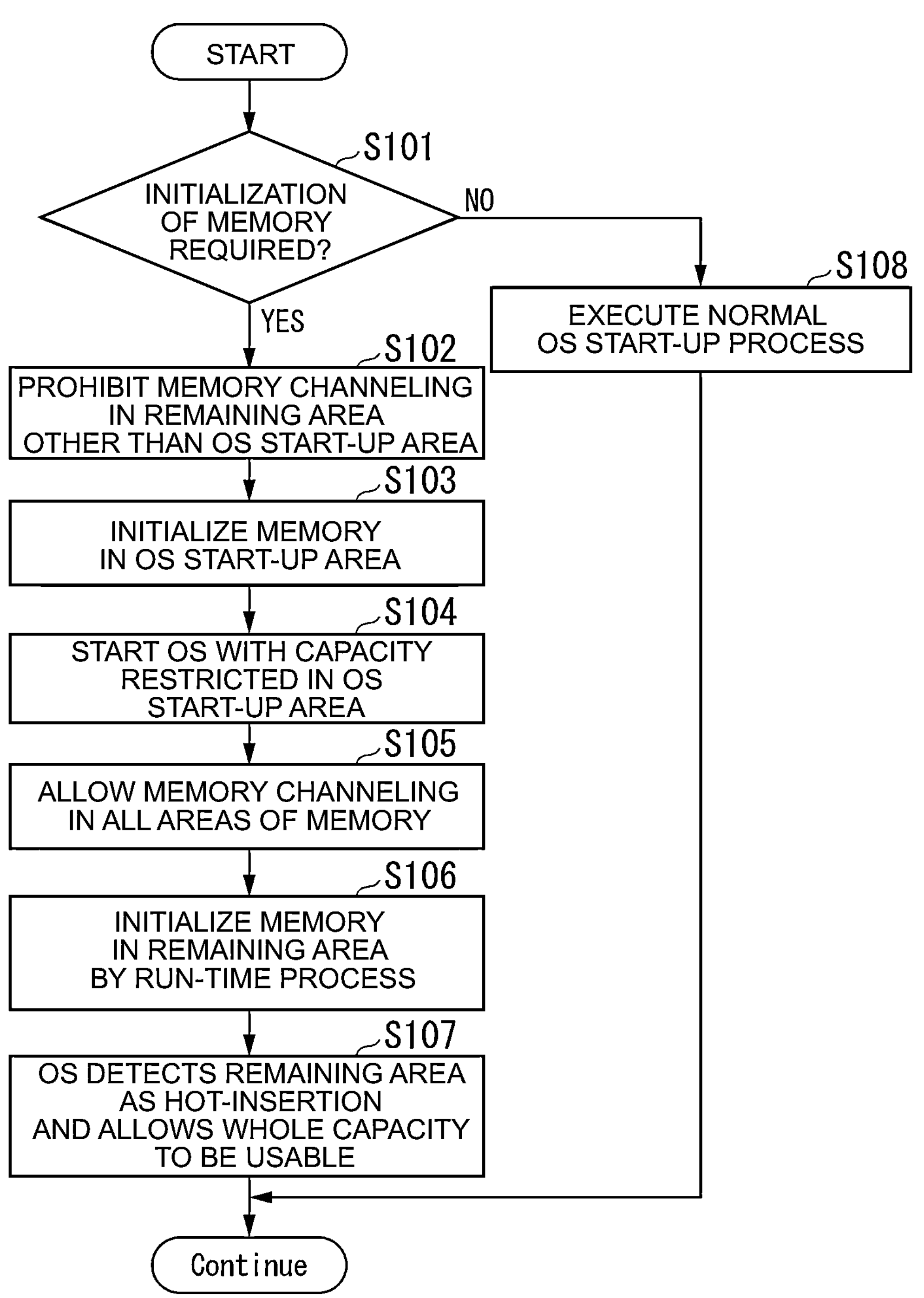
FIG. 4 is a flowchart illustrating an example of the operation of the laptop PC according to the present embodiment.

Referring now to FIG. 4, the following describes details of the OS start-up process by the laptop PC 1. FIG. 4 is a flowchart illustrating an example of the operation of the laptop PC 1 according to the present embodiment. With reference to FIG. 4, details of the OS start-up process by processing of the BIOS will be described.

As illustrated in FIG. 4, when the laptop PC 1 is turned on or restarted, the main control unit 10 determines whether or not initialization of the memory is required (step S101). The BIOS processor 110 of the main control unit 10 determines, for example, whether or not the memory initialization process for the main memory 12 is required due to any of the following three cases.

(1) A case where a user turns on the laptop PC 1 for the first time after the laptop PC 1 is shipped.

This case corresponds to a case where the laptop PC 1 is turned on for the first time and the memory initialization process is never executed, for example.

(2) A case where the configuration of the BIOS of the laptop PC 1 is changed.

This case corresponds to, for example, a case where the laptop PC 1 is started for the first time after the BIOS of the laptop PC 1 is updated or the configuration of the BIOS is changed.

(3) A case where the capacity or the module of the main memory 12 of the laptop PC 1 is changed.

This case corresponds to, for example, a case where the DIMM constituting the main memory 12 is added, deleted, or changed, and the laptop PC 1 is started for the first time after the configuration of the main memory 12 is changed.

When the memory initialization process for the main memory 12 is required (step S101: YES), the BIOS processor 110 advances the process to step S102. In the meantime, when the memory initialization process for the main memory 12 is not required (step S101: NO), the BIOS processor 110 advances the process to step S108.

In step S102, the BIOS processor 110 prohibits memory channeling in the remaining area 122 other than the OS start-up area 121. That is, the first initialization processing section 111 of the BIOS processor 110 allows access to the OS start-up area 121 (the usable state) and prohibits access to the remaining area 122 (the unusable state).

Subsequently, the first initialization processing section 111 initializes the memory of the OS start-up area 121 (step S103). The first initialization processing section 111 executes the first memory initialization process on the OS start-up area 121 (see FIG. 3A). Hereby, the OS start-up area 121 is brought into the usable state as illustrated in FIG. 3B, for example. The first initialization processing section 111 also stores, in the initialization information storage section 41, various pieces of configuration information about memory initialization as a result of the memory initialization process (the first memory initialization process) on the OS start-up area 121.

Subsequently, the start-up processing section 112 of the BIOS processor 110 starts the OS with a capacity restricted to the OS start-up area 121 (step S104).

Then, the second initialization processing section 113 of the BIOS processor 110 allows memory channeling in all areas in the memory (step S105). That is, the second initialization processing section 113 changes the access to the remaining area 122 to an allowed state (the usable state).

Subsequently, the second initialization processing section 113 initializes the memory in the remaining area 122 by a run-time process (step S106). The second initialization processing section 113 executes the second memory initialization process on the remaining area 122 (see FIG. 3C). Here, the run-time process is a process executed in parallel with normal processing of the OS start-up process. The second initialization processing section 113 stores, in the initialization information storage section 41, various pieces of configuration information about memory initialization as a result of the memory initialization process (the second memory initialization process) on the remaining area 122.

Subsequently, the OS detects the remaining area 122 as hot-insertion, so that the OS processor 120 of the main control unit 10 allows the whole capacity to be usable (step S107). Hereby, all areas in the main memory 12 are brought into the usable state as illustrated in FIG. 3D, for example. After step S107 is executed, the OS processor 120 advances the process to normal processing subsequent to the start-up of the OS.

In step S108, the start-up processing section 112 executes a normal OS start-up process. Herein, the start-up processing section 112 omits the memory initialization process for the main memory 12 by use of initialization information stored in the initialization information storage section 41 and executes an OS start-up process by use of all areas in the main memory 12. After step S108 is executed, the OS processor 120 advances the process to normal processing subsequent to the start-up of the OS.

Note that, in the flow illustrated in FIG. 4, a period from step S101 to step S103 corresponds to a period during which the display section 14 has a black screen (the display section 14 has no display). In the process to shift to step S104, the OS is started, so that a display image based on the OS is displayed on the display section 14.

As described above, the laptop PC 1 (an information processing apparatus) according to the present embodiment includes the main memory 12 (a system memory) and the main control unit 10 (a control unit). In the main memory 12, a program and data are stored. The main control unit 10 is a control unit configured to execute processing based on a BIOS and an OS and executes the memory initialization process including the first memory initialization process and the OS start-up process. As the first memory initialization process, the main control unit 10 executes initialization on an area (the OS start-up area 121) with a partial capacity necessary for start-up of the OS in the main memory 12 by processing of the BIOS before the OS is started. As the OS start-up process, the main control unit 10 starts the OS, including a display process on the display section 14 by processing of the BIOS after the first memory initialization process is executed. As the second memory initialization process, the main control unit 10 executes initialization on a remaining area (the remaining area 122) of the main memory 12 other than the area (the OS start-up area 121) with the partial capacity by processing of the BIOS after the OS start-up process is executed.

Hereby, the laptop PC 1 according to the present embodiment executes the memory initialization process (the first memory initialization process) on the area (the OS start-up area 121) with the partial capacity necessary for start-up of the OS before the OS is started, so that it is possible to reduce a black-screen period (a period during which the display section 14 has no display) before the OS is started, at the time when the apparatus (the laptop PC 1) is started.

In addition, as the second memory initialization process, the main control unit 10 executes initialization on the remaining area 122 by processing of the BIOS after the execution of the OS start-up process, so that the main memory 12 can be made usable immediately after the OS is started.

Further, in the present embodiment, at the time of start-up in any of the case where the laptop PC 1 is turned on for the first time, the case where the configuration of the BIOS is changed, and the case where the capacity or the module of the main memory 12 is changed, the main control unit 10 executes the first memory initialization process and the second memory initialization process. In the meantime, at the time of normal start-up, the main control unit 10 omits the first memory initialization process and the second memory initialization process and executes the OS start-up process as a normal OS start-up process.

Hereby, in a case where the memory initialization process is not required, the laptop PC 1 according to the present embodiment omits the first memory initialization process and the second memory initialization process, thereby making it possible to shorten a period of the normal OS start-up process.

Further, in the present embodiment, in the first memory initialization process, the main control unit 10 allows access to the area with the partial capacity (the OS start-up area 121), prohibits access to the remaining area (the remaining area 122), and then executes the initialization. In the second memory initialization process, the main control unit 10 allows access to the remaining area (the remaining area 122) and executes the initialization.

Hereby, the laptop PC 1 according to the present embodiment can reduce, with a simple method, a black-screen period (a period during which the display section 14 has no display) before the OS is started, and can more surely increase, with a simple method, a memory capacity usable after the OS is started.

Further, in the present embodiment, in the second memory initialization process, the main control unit 10 executes initialization on the remaining area (the remaining area 122) by a run-time process in parallel with normal processing of the OS start-up process and detects, by the OS, the remaining area (the remaining area 122) as hot-insertion.

Hereby, the laptop PC 1 according to the present embodiment executes the second memory initialization process by the run-time process, thereby making it possible to execute processing of the OS and to efficiently execute the memory initialization process on the remaining area (the remaining area 122).

In the meantime, a control method according to the present embodiment is a control method for controlling the laptop PC 1 including the main memory 12 in which a program and data are stored, and the main control unit 10 configured to execute processing based on the BIOS and the OS. The control method according to the present embodiment includes a first memory initialization process step, an OS start-up process step, and a second memory initialization process step. As the first memory initialization process step, the main control unit 10 executes initialization on the area (the OS start-up area 121) with the partial capacity necessary for start-up of the OS in the main memory 12 by processing of the BIOS, before the OS is started. As the OS start-up process step, the main control unit 10 starts the OS, including a display process on the display section, by processing of the BIOS after the execution of the first memory initialization process step. As the second memory initialization process step, the main control unit 10 executes initialization on the remaining area (the remaining area 122) of the main memory 12 other than the area (the OS start-up area 121) with the partial capacity by processing of the BIOS after the execution of the OS start-up process step.

Hereby, the control method according to the present embodiment yields the same effect as the laptop PC 1, so that it is possible to reduce a black-screen period (a period during which the display section 14 has no display) before the OS is started, at the time when the apparatus (the laptop PC 1) is started.

Note that the present invention is not limited to the above embodiment, and various modifications can be made without departing from the gist of the present invention.

For example, the above embodiment deals with an example in which the information processing apparatus is the laptop PC 1. However, the present invention is not limited to this, and the information processing apparatus may be other information processing apparatuses such as a tablet terminal device and a desktop PC, for example.

The above embodiment also deals with an example in which the OS of the laptop PC 1 is Windows (registered trademark). However, the present invention is not limited to this and may be applied to other OS such as Android (registered trademark) or iOS (registered trademark), for example.

The above embodiment also deals with an example in which the main control unit 10 executes the second memory initialization process as a run-time process (a process parallel with a normal OS process). However, the present invention is not limited to this, and the second memory initialization process may be executed as an exclusive process. In this case, the laptop PC 1 can shorten a processing period of the second memory initialization process.

The above embodiment also deals with an example in which, at the time of start-up in a case where the memory initialization process is required, the main control unit 10 executes the first memory initialization process and the second memory initialization process, but in a case where the memory initialization process is not required, the first memory initialization process and the second memory initialization process are omitted. However, the present invention is not limited to this. At the time when the OS is started, the main control unit 10 may always execute the first memory initialization process and the second memory initialization process, for example.

Note that each constituent of the laptop PC 1 includes a computer system. A program for implementing the function of each constituent of the laptop PC 1 may be stored in a computer-readable recording medium, and the program stored in the recording medium may be read in the computer system and executed, so that a process in each constituent of the laptop PC 1 may be executed. Here, that "the program stored in the recording medium is read in the computer system and executed" includes a case where the program is installed in the computer system. The "computer system" as used herein includes an OS or hardware such as a peripheral device.

The "computer system" may also include a plurality of computer devices connected via a network including the Internet, a WAN, a LAN, or a communication line such as a leased line. The "computer-readable recording medium" indicates a portable medium such as a flexible disk, a magneto-optical disk, a ROM, or a CD-ROM, or a storage device such as a hard disk provided in the computer system. The recording medium in which a program is stored as such may be a non-transitory recording medium such as a CD-ROM.

The recording medium also includes a recording medium provided inside or outside the laptop PC 1 such that the recording medium is accessible from a distribution server so as to deliver the program. Note that the program may be divided into a plurality of programs, and the plurality of programs may be downloaded at different timings and combined by each constituent in the laptop PC 1, or the divided programs may be distributed by different distribution servers. Furthermore, the "computer-readable recording medium" is a recording medium in which a program is kept for a given period, e.g., a server in a case where the program is transmitted via the network, or a volatile memory (RAM) in the computer system serving as a client. Further, the program may be intended to implement some of the above-mentioned functions. Furthermore, the program may be a so-called difference file (a difference program) that can implement the above-mentioned functions in combination with a program already stored in the computer system.

Some or all of the above-mentioned functions may be implemented as an integrated circuit such as an LSI (Large Scale Integration). Each of the above-mentioned functions may be individually provided as a processor or some or all of the functions may be integrally provided as a processor. Further, the technique to implement the functions as an integrated circuit is not limited to the LSI, and the functions may be implemented by a dedicated circuit or a general purpose processor. In a case where a technology of an integrated circuit that can be substituted for the LSI appears due to advancing of the semiconductor technology, an integrated circuit achieved by the technology may be used.

DESCRIPTION OF SYMBOLS

1 laptop PC
2 boot server
10 main control unit
11 CPU
12 main memory
13 video subsystem
14 display section
21 chip set
22 BIOS memory
23 SSD
24 audio system
25 WLAN card
26 USB connector
31 embedded controller (EC)
32 input section
33 power supply circuit
40 storage unit
41 initialization information storage section
42 BIOS information storage section
110 BIOS processor
111 first initialization processing section
112 start-up processing section
113 second initialization processing section
120 OS processor
121 OS start-up area
122 remaining area

What is claimed is:

1. An information processing apparatus comprising:

a system memory in which a program and data are stored; and a central processing unit (CPU) that executes processing based on a BIOS (Basic Input Output System) and an OS (Operating System), wherein the CPU executes:

a first memory initialization process of, before the OS is started, executing initialization on a partial area of the system memory with a capacity necessary for start-up of the OS by processing of the BIOS, an OS start-up process of starting the OS by processing of the BIOS with the partial area for the start-up of the OS, and a second memory initialization process of, after the execution of the OS start-up process, executing initialization on a remaining area of the system memory other than the partial area by processing of the BIOS, in the first memory initialization process, the CPU allows access to the partial area, prohibits access to the remaining area, and executes the initialization, in the second memory initialization process, the CPU allows access to the remaining area and executes the initialization, and during the OS start-up process executed after the first memory initialization process and before the second memory initialization process, the CPU executes a display process of displaying drawing data on a display section by processing of the BIOS.

2. The information processing apparatus according to claim 1, wherein:

the CPU executes the first memory initialization process and the second memory initialization process at a time of starting the OS in any of a case where the information processing apparatus is turned on for the first time, a case where a configuration of the BIOS is changed, and a case where a capacity or a module of the system memory is changed, and at a time of starting the OS normally, the CPU omits the first memory initialization process and the second memory initialization process and executes the OS start-up process as a normal OS start-up process.

3. The information processing apparatus according to claim 1, wherein in the second memory initialization process, the CPU executes the initialization on the remaining area by a run-time process in parallel with normal processing of the OS start-up process and detects, by the OS, the remaining area as hot-insertion.

4. A control method for controlling an information processing apparatus including a system memory in which a program and data are stored, and a central processing unit (CPU) that executes processing based on a BIOS (Basic Input Output System) and an OS (Operating System), the control method comprising:

a first memory initialization process step of, before the OS is started, the CPU executing initialization on a partial area of the system memory with a capacity necessary for start-up of the OS by processing of the BIOS;

an OS start-up process step of the CPU starting the OS by processing of the BIOS with the partial area for the start-up of the OS;

a second memory initialization process step of, after the execution of the OS start-up process step, the CPU executing initialization on a remaining area of the system memory other than the area with the partial capacity by processing of the BIOS, wherein the first memory initialization process comprises allowing access to the partial area, prohibiting access to the remaining area, and executing the initialization, the second memory initialization process comprises allowing access to the remaining area and executing the initialization; and during the OS start-up process executed after the first memory initialization process and before the second memory initialization process, executing a display process of displaying drawing data on a display section by processing of the BIOS.

* * * * *